US007440427B1

(12) United States Patent
Katz

(10) Patent No.: US 7,440,427 B1
(45) Date of Patent: Oct. 21, 2008

(54) INCREASING CHANNEL CAPACITY OF TDMA TRANSMITTERS IN SATELLITE BASED NETWORKS

(75) Inventor: Daniel A. Katz, 87 Tzahal st., Kiryat Ono (IL) 55451

(73) Assignee: Daniel A. Katz, Kiryat-Ono (IL)

( * ) Notice: Subject to any disclaimer, the term of this patent is extended or adjusted under 35 U.S.C. 154(b) by 0 days.

(21) Appl. No.: 12/046,509

(22) Filed: Mar. 12, 2008

(51) Int. Cl.
*H04B 7/212* (2006.01)

(52) U.S. Cl. .................. 370/321; 370/337; 370/347; 370/458

(58) Field of Classification Search .................. None
See application file for complete search history.

(56) References Cited

U.S. PATENT DOCUMENTS

| 5,355,140 | A | * | 10/1994 | Slavin et al. | 342/386 |
| 5,367,306 | A | * | 11/1994 | Hollon et al. | 342/386 |
| 5,414,432 | A | * | 5/1995 | Penny et al. | 342/357.16 |
| 5,517,199 | A | * | 5/1996 | DiMattei | 342/357.09 |
| 6,115,371 | A | * | 9/2000 | Berstis et al. | 370/345 |
| 6,388,617 | B1 | * | 5/2002 | Flood et al. | 342/386 |
| 6,992,623 | B2 | * | 1/2006 | Street | 342/385 |
| 7,082,111 | B2 | | 7/2006 | Amouris | |
| 2006/0007038 | A1 | * | 1/2006 | Boling et al. | 342/357.1 |

* cited by examiner

*Primary Examiner*—Frank Duong

(57) ABSTRACT

The present invention discloses a method for increasing the channel capacity of a communications network, comprising a plurality of one-way TDMA transmitters sharing said channel, and at least one compatible receiver, by reducing transmission collisions among said transmitters. This is achieved by coupling a Global Navigation Satellite System (GNSS) decoder, such as a GPS receiver, to each transmitter, and limiting transmissions to discrete time slots, determined by timing signals provided by said GNSS. Further, this basic set of time slots is divided into several sub sets, and each transmitter selects a sub set of time slots according to its geographic location, in order to enable reusing time slots in spaced apart areas, as frequencies are reused in cellular networks. Then, each transmitter selects its own transmission time slot, from said sub set, in a way that statistically minimizes collisions among nearby transmitters. The present invention does not intend to ensure collision-free communications, yet is projected to reduce the transmission collision rate among simplex in nature transmitters, which have no means to detect other transmissions, or discover if a transmission was successful. One embodiment of this invention is related to distress radio beacons in satellite based Search and Rescue (SAR) systems, such as Cospas-Sarsat.

18 Claims, 4 Drawing Sheets

Overview of TDMA Transmitters in a Satellite Based Network

Figure 1 - Overview of TDMA Transmitters in a Satellite Based Network
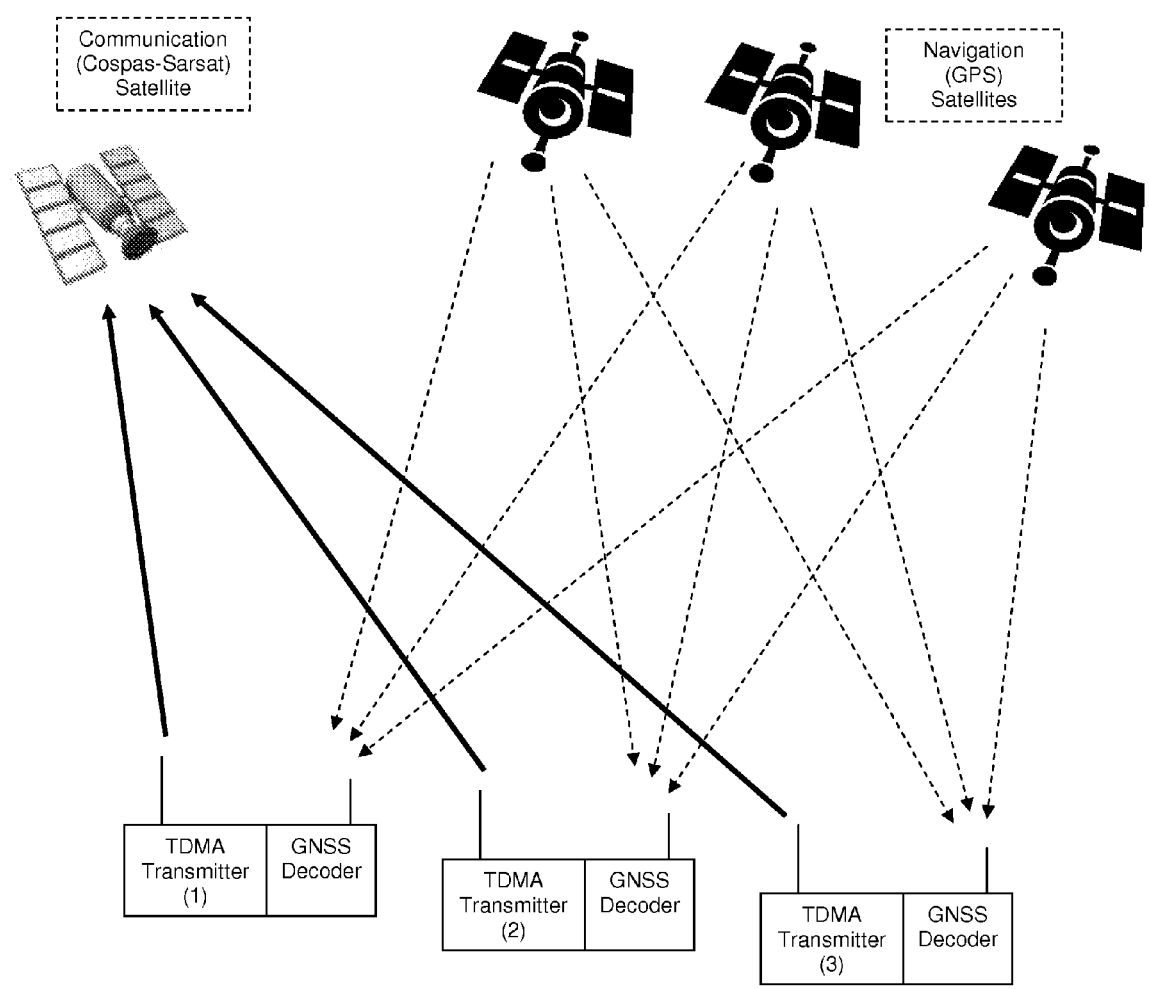

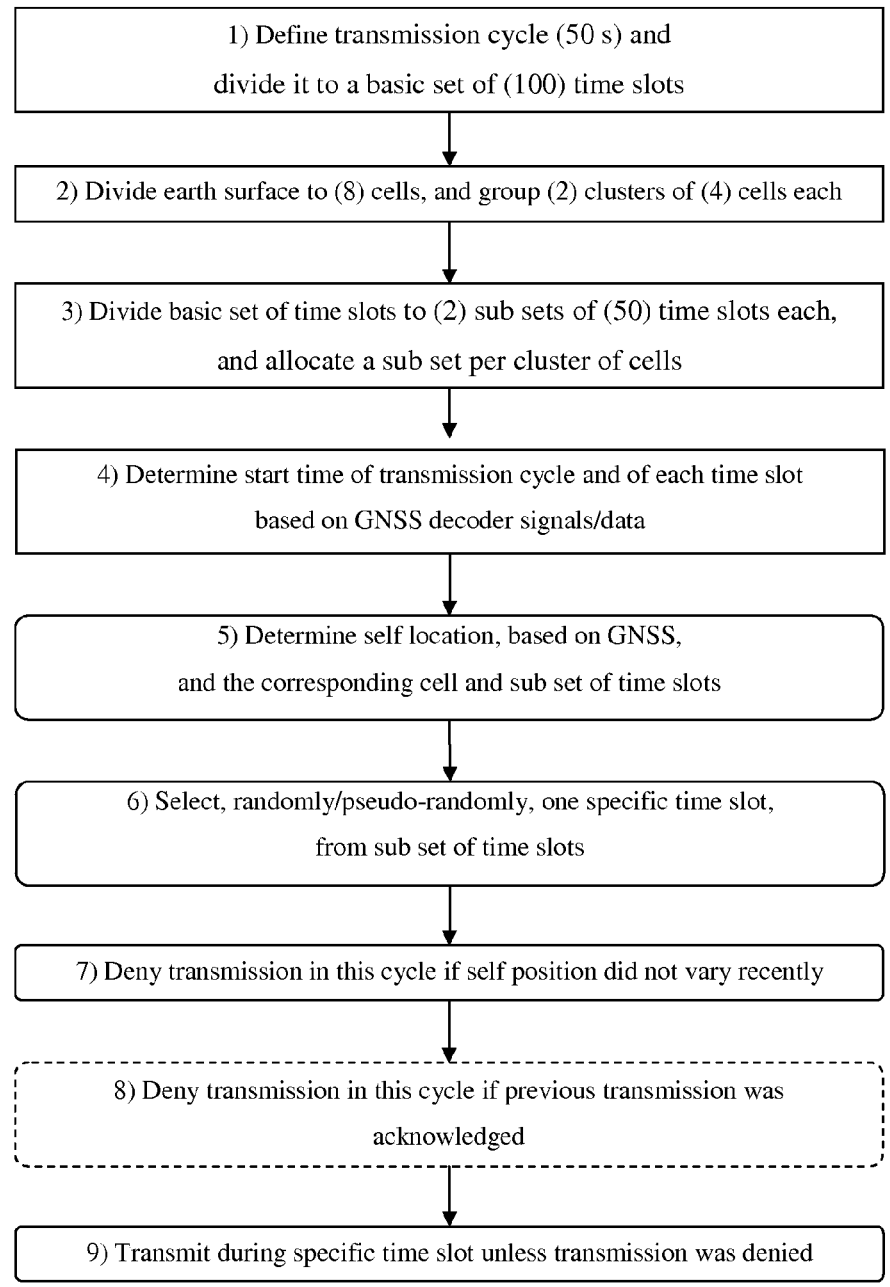

Figure 3 – Geographical Partitioning of Earth Surface into Eight Communication Cells
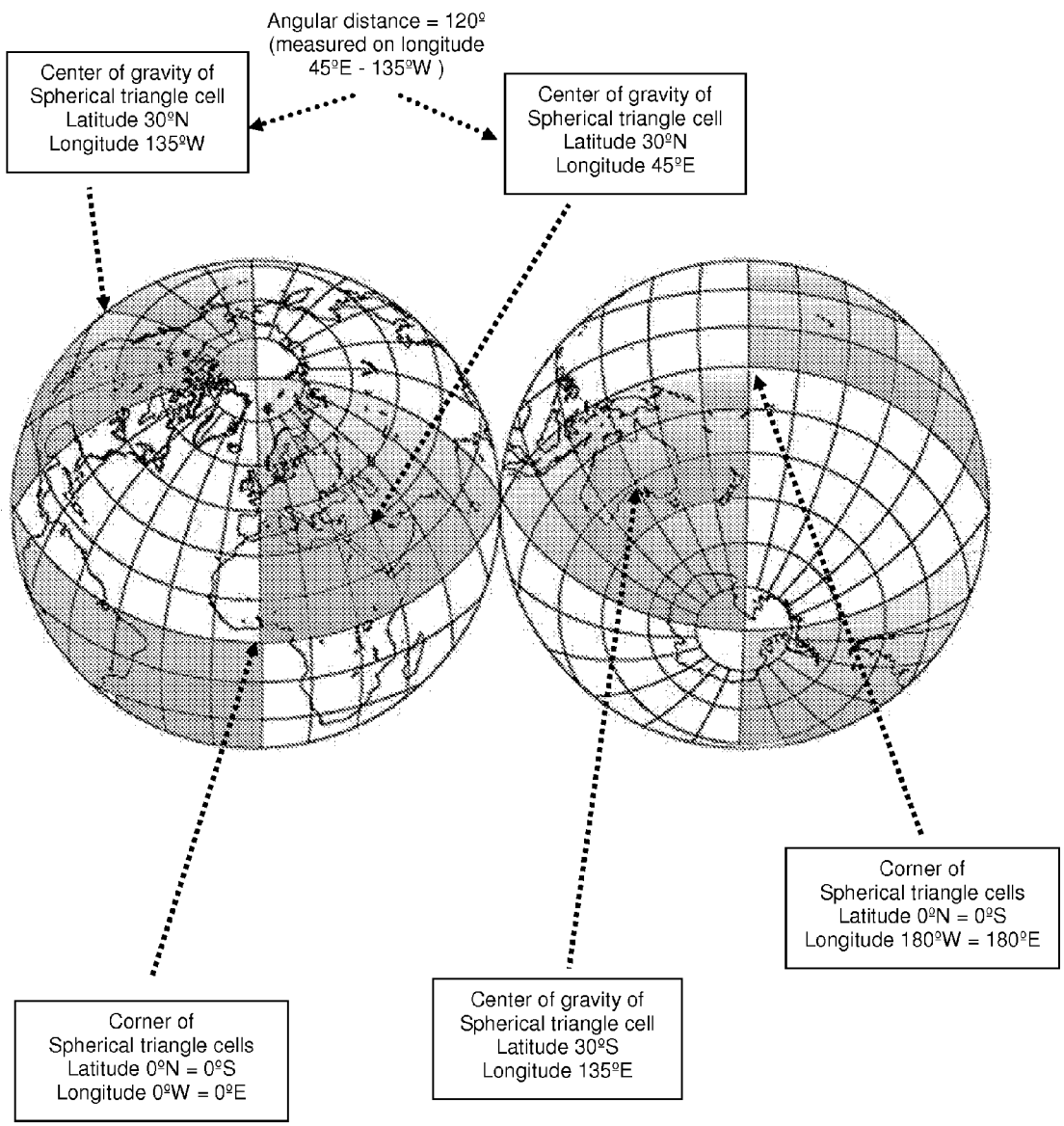

Figure 4a – Footprint of Satellite on Earth Surface (Isometric view)
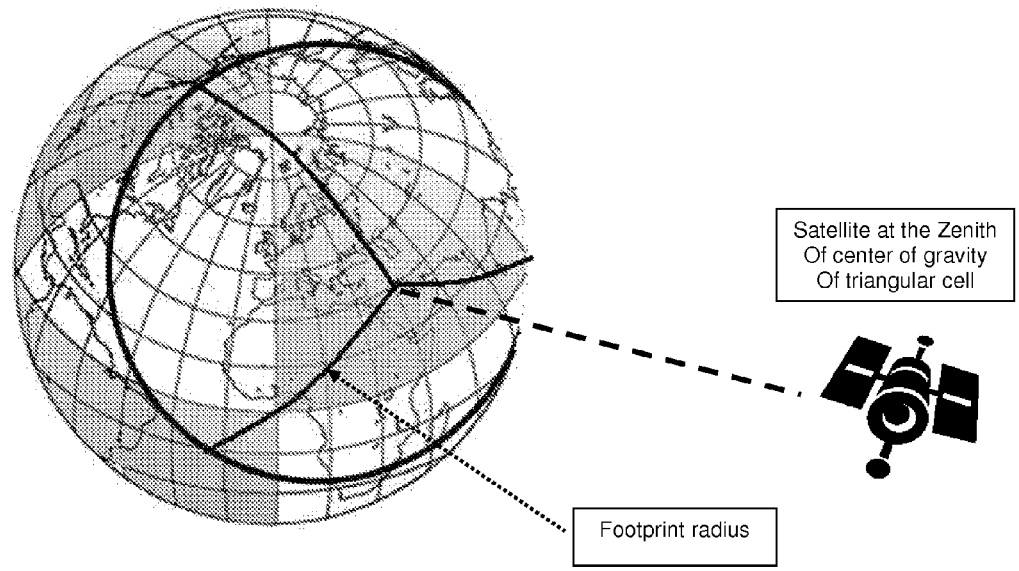
Figure 4b – Footprint of Satellite on Earth Surface (Sectional view)
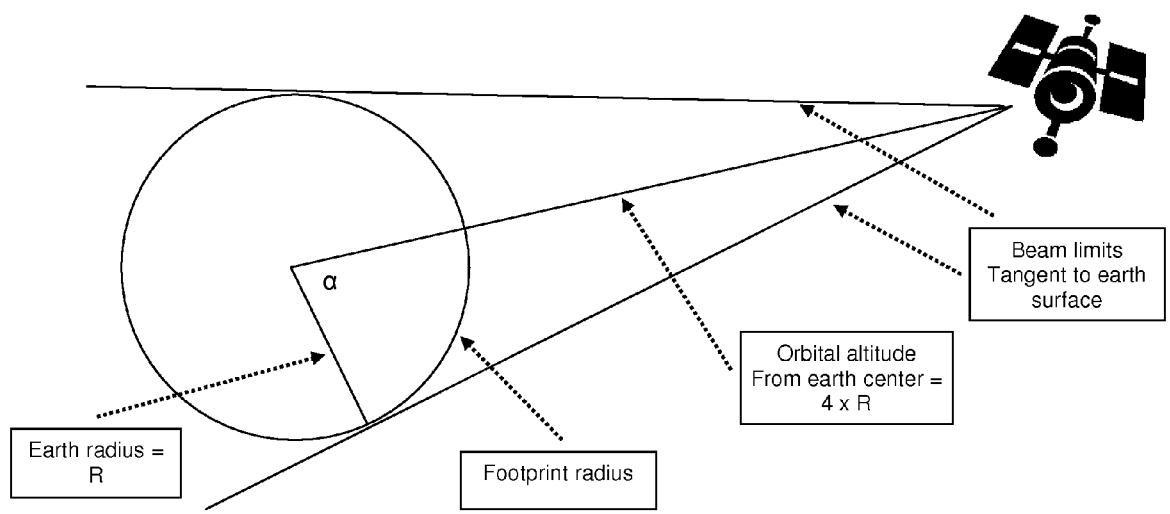

INCREASING CHANNEL CAPACITY OF TDMA TRANSMITTERS IN SATELLITE BASED NETWORKS

BACKGROUND OF INVENTION

The present invention relates to communication networks that obtain multiple transmitters accessing a shared medium such as a frequency channel or frequency band, in a time division manner. Such channel access methods, usually called Time Division Multiple Access (TDMA), are very popular among satellite communication networks, as well as cellular networks and even with landline communications protocols.

When multiple users access a shared communications channel, and occasionally several signals transmitted by several users simultaneously arrive at a single receiver, such signals might collide or interfere with each other, and reduce receiving success probability. Clearly, such transmission collisions decrease the channel capacity, i.e. the number of users that can share this channel at a certain quality of service.

Transmission collisions become a significant issue in TDMA systems, as the number of transmitters and volume of traffic increase, per allocated transmission time and channel bandwidth, and particularly when transmitters are unable to communicate with each other and cannot synchronize or mutually coordinate their transmission timing.

A typical type of such TDMA systems is related to distress radio beacons communicating with satellites. Such wireless transmitters may be deployed in large quantities, all over the world, yet usually share a narrowband channel or a limited set of frequencies. Further, these distress beacons are activated upon local triggering and their transmissions are not synchronized in time with each other, since cannot communicate with each other and do not necessarily obtain a precise time reference. As such radio beacons are most of the time off, typically for several years, and transmit only in rare occasions, for a short time, normally in periodic bursts for several days, a narrowband frequency channel can basically be shared by these beacons. However, as tens and hundreds of thousands of such beacons are deployed, sharing a narrowband operating channel, simultaneous transmissions might statistically occur, interfering with each other and decreasing the probability of a distress message to be detected. Then, in order to ensure a certain quality of service, i.e. a minimal probability for a distress message to be detected within a specific period of time, the number of transmitters per channel should be limited. Obviously, such a system could be more efficient in exploitation of the allocated spectrum, if channel capacity could be increased, e.g. by reducing transmission collision rate.

One particular TDMA satellite system, COSPAS-SARSAT, is specifically discussed hereby. Focusing on this specific case is done for clarification purposes and is not to limit the scope of the invention.

Cospas-Sarsat is a satellite communications system to assist Search and Rescue (SAR) of people in distress, all over the world and at anytime. The system was launched in 1982 by the USA, Canada, France and the Soviet Union (now Russia) and since then, it has been used for thousands of SAR events and has been instrumental in the rescue of over 20,000 lives worldwide. The goal of the system is to detect and locate signals of distress radio beacons in order to support all organizations in the world with responsibility for SAR operations, whether at sea, in the air or on land. The system uses spacecraft—Low Earth Orbit (LEO); Medium Earth Orbit (MEO)—in the future; and Geostationary (GEO) satellites, and ground facilities, to detect and locate compatible radio beacons. Cospas-Sarsat radio beacons operate in the 406 MHz band (and 121.5 MHz until 2009). The position of the beacon is determined either by the Doppler shift of the received beacon signal or by position data provided by an embedded Global Navigation Satellite System (GNSS) decoder (i.e. receiver), integrated with the radio beacon. The radio beacon location and other related data are then forwarded from satellites to the proper shore stations via the Cospas-Sarsat network. A detailed description of the Cospas-Sarsat System is provided in the document "Introduction to the Cospas-Sarsat System, C/S G.003"—http://cospas-sarsat.org/Documents/gDocs.htm Numerous present and future GNSS decoders can be considered to be integrated with Cospas-Sarsat radio beacons, mainly the presently operative US Global Positioning System (GPS), but also the Russian GLONASS (or GLONAS), the upcoming European Galileo and the planed Chinese COMPASS and Indian IRNSS.

Several types of Cospas-Sarsat beacons are approved for use, differing mainly in their mechanical structure and activation method, customized for different applications: a) Emergency Position Indicating Radio Beacon (EPIRB) for marine use; b) Emergency Locator Transmitter (ELT) for aviation use; and c) Personal Locator Beacon (PLB) for personal use. PLBs are popular for terrestrial use, by hikers, skiers, hunters and travelers, in addition to marine utilization.

Cospas-Sarsat radio beacons are independent transmitters, totally disconnected from each other; however share a common narrow frequency band. The total bandwidth allocated for Cospas-Sarsat is 100 KHz (406.0-406.1 MHz), divided to 3 KHz bandwidth channels. Normally, each beacon is factory set to one of these channels, not configured to be changed in the field. Then, each channel (theoretically 33 channels, however practically much less mainly due to Doppler shift limitations and system overhead) is shared by tens or hundreds of thousands of beacons, considering that a beacon is most of the time off. When activated (automatically or manually), a Cospas-Sarsat beacon transmits short bursts, each one approximately 0.5 seconds long, every 50 seconds, for several days, until its battery drains. In order to avoid repetitive collisions between two active beacons, a beacon is required to set its transmission cycle to 50+/−2.5 seconds, and the period should be randomized around a mean value of 50 seconds, so that time intervals between transmissions are randomly distributed on the interval 47.5 to 52.5 seconds. Cospas-Sarsat designers calculated the channel capacity based on the population of beacons per channel (e.g. 200K), rate of activation (e.g. 1:100K), activity period (e.g. 0.5 seconds every 50 seconds for 7 days) and the required detection probability (e.g. 95% to detect a distress message within 5 minutes). A comprehensive analysis of the system parameters and performance can be found through the following links http://cospas-sarsat.com/DocumentsTSeries/T12Nov1 07 CompleteDocPart1.pdf http://cospas-sarsat.com/DocumentsTSeries/T12Nov1 07 CompleteDocPart2.pdf A simple calculation shows that the chance of two Cospas-Sarsat beacons transmissions to collide is roughly 2% (assuming detection by same receiver); provided that each transmission is 0.5 seconds long and transmission cycle is 50 seconds. This calculation is based on the observation that for any first beacon transmission, a second beacon transmission will collide (even partially) with, if it starts between 0.5 seconds before to 0.5 seconds after the first transmission starts, i.e. have (0.5+0.5)/50=1:50 collision probability.

This collision probability of two Cospas-Sarsat active beacons could be significantly reduced, applying a time slotted transmission method. For example, if the transmission cycle of 50 seconds is divided to 100 adjacent time slots of 0.5 seconds each, and if transmissions take not more than 0.5 seconds, then for any first beacon transmission, a second beacon transmission will collide with, only if using the same time slot, i.e. achieve a collision probability of about 1:100.

This technique is a well known variation of a TDMA communications method called ALOHA. ALOHA is a simple communications scheme in which each transmitter in a network sends data whenever there is a frame to send. If the frame is successfully received, the next frame is sent. If the frame fails to be received at the destination, it is sent again. This protocol was originally developed at the University of Hawaii for use with satellite communications in the Pacific, among remote deployed devices. An improvement to the original Aloha protocol was Slotted Aloha, which introduced discrete timeslots for transmission and doubled the maximum Aloha throughput.

Yet, such a slotted method requires careful time synchronization among transmitters. For this purpose, an accurate Time of Day (TOD) reference could be provided for all transmitters by a GNSS such as GPS. So it is disclosed by U.S. Pat. No. 7,139,258 to Tillotson. Yet, Tillotson relates to a specific case where the duration of RF transmitted bursts is shorter than the transmission propagation time between said transmitters. This is usually not the case with many systems, particularly based on satellites, such as Cospas-Sarsat, where burst duration is about 500 milliseconds but propagation time is about 120 milliseconds (for most distant satellites—Geostationary).

Still an important issue to consider is the propagation time (or propagation delay) variation, caused by the variety of distances between different transmitters to one receiver. Such difference can cause signals transmitted from two beacons, originally separated in time, to overlap and collide at the receiver due to the longer time delay of the signal that traveled a longer distance. For example, if two remote transmitters are detected by the same satellite receiver, but one transmitter is closer to the receiver than the second transmitter, by about 6,400 Kms (roughly the radius of earth), then the first signal will travel about 22 milliseconds less. Since such beacons are deployed worldwide, and can be placed anywhere on earth, and since most of the receiving satellites (all excluding the Geostationary) are constantly moving relatively to earth, it is quite difficult to control the propagation delay variation in such a satellite based network.

A further correlation can be found between transmission collisions and the location of transmitters relatively to each other, considering a worldwide scale. For example, if two active transmitters are located far away from each other, e.g. on Antipodes, there is a considerable chance that each of these transmissions will be detected by a different satellite, thus will not interfere with each other. Further, this characteristic can be utilized as done in cellular networks, i.e. divide the earth surface to several cells and reuse the same channels and/or timeslots in geographically distant cells. Yet, communication isolation based on geographical separation is more complicated to achieve in satellite based networks than in terrestrial cellular networks. Actually, satellite based networks are often designed to provide a wide geographical coverage, which contradicts with the cellular concept of wireless communication isolation based on geographical separation. For example, a geostationary satellite as employed in systems as Cospas-Sarsat or Inmarsat can cover about one third of the earth surface. However Cospas-Sarsat employs also LEOs and in the near future its payloads will be installed onboard MEOs (Galileo and GPS), which have a smaller footprint on earth surface and may better serve for cellular communication methods related to transmitters located on earth surface.

U.S. Patent Application 20070133592 to Zheng discloses a method for time slot scheduling in a wireless TDMA mesh network based on spatial orientation of the network nodes. Yet this method requires nodes to communicate with each other.

U.S. Pat. No. 5,838,674 to Forssen discloses circuitry and method for TDMA communication system, employing a plurality of time slots, enabling concurrently transmitting at least two signals by two stations spatially spaced apart from one another and positioned at any location within a selected area. However, this method requires a plurality of antennas at each of said stations, and an antenna pattern former to indicate the positioning of said transmitting stations.

U.S. Pat. No. 7,304,963 to Amouris discloses a method and system for dynamically allocating a set of broadcast TDMA channels to a network of transceiver nodes. This method is based on timeslot partitioning and geographic location, yet, it deals with a network of transceiver nodes, i.e. nodes capable of receiving, as well as transmitting, and nodes that share not a single channel but a plurality of channels. Further, for a specific time slot and specific positioning coordinates, this method allocates a unique channel, thus, if would not avoid a communications conflict between nearby nodes.

U.S. Pat. No. 7,082,111 to Amouris discloses a method and system for dynamically allocating time slots of a common TDMA broadcast channel to a network of transceiver nodes. This invention allocates time slots to TDMA devices according to their geographical position, yet it is adapted to nodes capable of receiving. Accordingly, this method requires nodes to receive data in order to resolve time slot allocation conflicts occurring when two transceivers are in close distance. In addition, Amouris does not refer to the length of time slots, neither to propagation delay issues that might be significant in satellite based networks. Furthermore, this invention does not teach or suggest using a GNSS or GPS for accurate timing and location determination.

U.S. Pat. No. 6,115,371 to Berstis discloses a satellite uplink separation using time multiplexed global positioning system cell location beacon system. This method, for allocating bandwidth to devices seeking to initiate contact with a communication service, suggests using time slots according to self location determined by GPS. Yet, Berstis' invention is also related to devices capable of receiving. Furthermore, it deals with a preliminary and relatively short phase, in a two-way communications network, which has the limited role of initiating a contact with a communication service, thus, for example, is limited in avoiding transmission collisions between devices placed in the same cell.

The present art methods described above have not yet provided satisfactory solutions to the problem of transmission collisions among TDMA transmitters that share a common one-way communications channel.

It is an object of the present invention to provide a system and method to increase the capacity of a channel shared by TDMA transmitters, by reducing the collision rate among said TDMA transmitters.

It is also an object of the present invention to provide a system and method for reducing the collision rate among remote TDMA transmitters that have no means to communicate with each other so cannot mutually coordinate their transmissions.

It is another object of the present invention to provide a system and method for reducing the collision rate among TDMA transmitters, particularly distress radio beacons communicating with satellite borne receivers.

It is still an object of the present invention to provide a system and method for reducing the collision rate among TDMA transmitters, based on time synchronization and positioning information provided by a GNSS such as GPS or Galileo or GLONASS.

It is yet another object of the present invention to provide a method for improving present or/and planed systems for SAR and in relation to GNSS, such as Cospas-Sarsat and Galileo.

It is still another object of the present invention to provide a system and method for reducing collisions among TDMA transmitters, minimizing cost and size and power consumption of said transmitters.

It is nonetheless an object of the present invention to provide an apparatus and method for reducing collisions among TDMA transmitters, which are part of systems for SAR such as Cospas-Sarsat.

Other objects and advantages of the invention will become apparent as the description proceeds.

SUMMARY OF INVENTION

The invention is directed to a system for Time Division Multiple Access (TDMA) communications, comprising a plurality of one-way transmitters sharing a communication channel and at least one matching receiver, and a Global Navigation Satellite System (GNSS) decoder coupled to each of said transmitters, said transmitters configured to define: i) a transmission cycle divided to a set of adjacent time slots; ii) a geographical partition of earth surface to cells; and iii) a sub set of time slots, comprising a plurality of time slots from said set of time slots, allocated to each of said cells; each transmitter configured to transmit during one time slot or less per transmission cycle, wherein said one time slot determined by each transmitter as following: a) determining the start time of transmission cycles and time slots according to at least a timing signal and/or time data acquired from said GNSS decoder; b) determining self location and the corresponding cell according to at least data acquired from said GNSS decoder; c) selecting one time slot from the sub set of time slots allocated to said corresponding cell, in a random or pseudo-random way.

The present invention is related to transmitters, capable only of one-way (simplex) communications, which normally cannot detect each other's transmissions and cannot have a direct feedback from the receiver, thus might interfere with each other. Then, as more transmitters share said communications channel, transmission collision rate can considerably reduce the channel capacity. The present invention suggests a method to decrease the collision rate in such networks and consequently increase the channel capacity.

The most presently popular GNSS which suits the current invention is the US Global Positioning System (GPS), yet other systems may be suitable, either operating presently or in the future, such as the Russian GLONASS (or GLONAS), the European Galileo, Chinese COMPASS and Indian IRNSS. For the purpose of the current invention, said GNSS decoder should provide to said coupled transmitter at least timing signals and positioning data.

According to the present invention, transmission time is divided to cycles, and each cycle is further divided into a basic set of adjacent time slots, in a manner known to all transmitters. This time division limits transmissions to start at discrete times only, i.e. at the beginning of a time slot. The actual determination of the transmission cycle and time slot boundaries is done in real time by each transmitter according to timing signals (normally—1 pulse per second signal) and time data (normally—TOD message, i.e. current date that belongs to a time reference signal) provided by said coupled GNSS decoder. Using discrete time slots can significantly upgrade the throughput of current unsynchronized TDMA systems such as Cospas-Sarsat, similarly to the upgrading introduced to Aloha by slotted Aloha, as discussed above.

In the preferred embodiment, the transmitters periodically transmit packets of data, in a cyclic way. Each packet of data basically contains a unique identification number (ID) associated with each specific transmitter, positioning data as provided by the coupled GNSS decoder and some additional synchronization and status indicating bits. Thus, all transmissions are substantially equal in bit length and in time duration. Such transmission payload is typical to distress radio beacons, particularly radio beacons compatible with satellite systems for Search and Rescue (SAR), such as Cospas-Sarsat. Some non limiting examples for such transmitters are: an Emergency Position Indicating Radio Beacon (EPIRB) for marine use; an Emergency Locator Transmitter (ELT) for aviation use; and a Personal Locator Beacon (PLB) for terrestrial/personal use.

Time slot duration can be set to as short as the transmission time of said shortest data packet, and as long as the sum of: a) the transmission time of said longest data packet; plus b) the maximum difference in propagation time of any two TDMA transmissions detectable by one receiver in the network. This maximum propagation delay variation is considered in order to avoid collisions among transmissions starting at different time slots.

Further, the present invention teaches reusing the same transmission time slots in spaced apart areas, similarly to the way that cellular networks reuse transmission spectrum in spaced apart cells. According to that, the basic set of time slots is further divided into sub sets of time slots, each sub set associated with a cluster of cells, which is defined in terms of geographical coordinates, either in advance or in real time, in a manner known to all transmitters. Then, each transmitter is configured to determine its position, in real time, according to data provided by said coupled GNSS decoder, and accordingly determine which sub set of time slots is allocated for its transmission. As a person skilled in the art may understand, this geographical partitioning should achieve good communication isolation for transmitters placed in different cells, relatively to the compatible receivers.

From this geographically based sub set of time slots, each transmitter is further configured to select its specific transmission time slot, according to another method, in order to decrease the collision rate among transmitters placed in the same cell. Possibly, an algorithm based on the transmitter's unique ID could be applied, which could be efficient if the number of transmitters is not larger than the number of available time slots, as the skilled person may appreciate. The preferred embodiment deals with a multitude of transmitters that share a relatively few time slots per cycle, so a different method is preferably used, based on a random or pseudo random selection, i.e. giving an equal probability to select any of said sub set time slots.

Still considering the geographical partitioning associated with time slot sub sets, according to a non limiting example, the geoid (earth mean ocean surface) is divided into 12 longitudinal slices, bounded by 30° spaced apart meridians, all slices cornered at the north pole and at the south pole, as following: 1) from 0° to 30°E; 2) from 30°E to 60°E; 3) from 60°E to 90°E; 4) from 90°E to 120°E; 5) from 120°E to 150°E; 6) from 150°E to 180°; 7) from 180° to 150°W; 8) from 150°W to 120°W; 9) from 120°W to 90°W; 10) from 90°W to 60°W; 11) from 60°W to 30°W; 12) from 30°W to 0°. As the skilled person may appreciate, each of these slices is comprised of two spherical triangular cells, one on the northern hemisphere and another on the southern hemisphere, having a common base on the equator. Then, all odd numbered slices (1, 3, 5, 7, 9, 11) may be clustered together and be associated with one sub set of time slots and the other six slices may form another cluster, associated with another sub set of time slots. Such a cellular partitioning provides a certain degree of communication isolation, due to the longitudinal angular separation of 30° between any two near slices. Yet, as a person skilled in the art may appreciate, this communication isolation could be improved, for example, using a similar cellular partitioning, however different allocation of sub sets of time slots. According to this still non limiting improved example, the geoid is divided to the same 24 triangular cells, also forming two clusters, each cluster with 12 cells and associated with one sub set of time slots. However clusters here are formed differently: 6 cells are taken from the northern hemisphere, 30° longitudinally separated, and the other 6 cells are taken from the southern hemisphere, also 30° longitudinally separated, yet southern cells are 30° shifted eastwards related to the northern cells of the same cluster. Intuitively, such a geographical partitioning and time slot allocation, provides a better cellular isolation, as will be elaborated later.

It is to be noted that in the scope of the present invention, the terms "geoid", "globe", "earth" and "sphere", are used in a similar context, sometimes with the prefix "surface of", referring to the spherical body defined as the mean ocean surface of the earth, i.e. earth surface neglecting topography.

There are other ways to define the geographical boundaries of cells related to the present invention. Obviously, an efficient partitioning should also consider the spatial deployment of receivers, often satellite mounted. If more satellites are deployed, and further closer to earth surface, partitioning can be refined and obtain a higher degree of transmission isolation. To illustrate this point, the partitioning of earth surface to 12 longitudinal slices of 30° width, as described above, could be particularly efficient (at least for clarification purposes, as this example might be impractical in the real world) if a constellation of satellites is deployed in 12 low orbits, where each orbit is just above the center meridian of each of said slices, i.e. 1) 15°E; 2) 45°E; 3) 75°E; etc. Alternatively, since LEO and MEO satellites usually move compared to earth surface, a geographical partitioning of earth surface according to the present invention may be dynamic, i.e. change in time according to the momentary spatial position of satellites.

In this context, the future augmentation of the Cospas-Sarsat constellation with additional Galileo and GPS satellites may well increase the effectiveness of the present invention, since this augmentation increases the probability that different transmitters will be detected by different receivers.

Also, as a person skilled in the art may appreciate, such a geographical partitioning may be adjusted according to the distribution of beacons, in order to balance transmission congestion, as possible. According to this logic, geographic cells are defined to reflect not necessarily similar areas but ideally contain similar number of transmitters, specifically active transmitters.

The present invention may be further refined in several ways, to decrease transmission collision rate. According to one way, transmitters may be configured to further control the transmission according to the variation of their position in time, since positioning data is in many cases the most important data been transmitted. For example, if a transmitter's position hardly changes, then, instead of keeping transmitting redundant data, a transmitter can be configured to pass over some transmission cycles.

Another way to further increase the channel capacity shared by TDMA transmitters, by decreasing the transmission collision rate, is to control transmission upon receiving transmission acknowledgements. A non limiting example for this method is based on the upcoming Galileo positioning system. As already published, it is planed to mount compatible Cospas-Sarsat payloads onboard Galileo satellites, and add a downlink channel for beacon transmission acknowledgement. Such combined GNSS (Galileo) and SAR (Cospas-Sarsat) service would enable detecting a distress signal transmitted by a distress radio beacon transmitter, and sending a proper acknowledgement message embedded in the Galileo navigation signals, detectable by Galileo decoders (receivers). This way, a device comprised of a Cospas-Sarsat transmitter coupled with a Galileo decoder, could transmit a distress signal and receive a proper acknowledgement for this transmission. Furthermore, in the context of the present invention, such a device would enable reducing the transmission repetition rate, upon a transmission been acknowledged, and as a result reduce the collision rate probability and increase the channel capacity.

The invention is further directed to a transmitter in a network for Time Division Multiple Access (TDMA) communications, comprising a plurality of such one-way transmitters sharing a communication channel and at least one matching receiver, and a Global Navigation Satellite System (GNSS) decoder coupled to each of said transmitters, said transmitters configured to define: i) a transmission cycle divided to a set of adjacent time slots; ii) a geographical partition of earth surface to cells; and iii) a sub set of time slots, comprising a plurality of time slots from said set of time slots, allocated to each of said cells; each transmitter configured to transmit during one time slot or less per transmission cycle, wherein said one time slot determined by each transmitter as following: a) determining the start time of transmission cycles and time slots according to at least a timing signal and/or time data acquired from said GNSS decoder; b) determining self location and the corresponding cell according to at least data acquired from said GNSS decoder; c) selecting one time slot from the sub set of time slots allocated to said corresponding cell, in a random or pseudo-random way.

The invention is also directed to a computer program product in a computer readable medium for a transmitter in a network for Time Division Multiple Access (TDMA) communications, comprising a plurality of one-way transmitters sharing a communication channel and at least one matching receiver, and a Global Navigation Satellite System (GNSS) decoder coupled to each of said transmitters, said transmitters configured to define: i) a transmission cycle divided to a set of adjacent time slots; ii) a geographical partition of earth surface to cells; and iii) a sub set of time slots, comprising a plurality of time slots from said set of time slots, allocated to each of said cells; each transmitter configured to transmit during one time slot or less per transmission cycle, wherein said one time slot determined by each transmitter as following: a) determining the start time of transmission cycles and time slots according to at least a timing signal and/or time data acquired from said GNSS decoder; b) determining self location and the corresponding cell according to at least data acquired from said GNSS decoder; c) selecting one time slot from the sub set of time slots allocated to said corresponding cell, in a random or pseudo-random way.

Other objects and advantages of the invention will become apparent as the description proceeds.

BRIEF DESCRIPTION OF DRAWINGS

The above and other characteristics and advantages of the invention will be better understood through the following illustrative and non-limitative detailed description of preferred embodiments thereof, with reference to the appended drawings, wherein:

FIG. 1 illustrates an overview of TDMA transmitters in a satellite based network. The figure shows three TDMA transmitters, each transmitter coupled to a GNSS decoder. Shown also are three GPS satellites representing a GNSS and one Cospas-Sarsat satellite representing a satellite communication SAR system. Wirelessly transmitted signals are illustrated by lines: a) from GNSS/GPS satellites to GNSS decoders; and b) from TDMA transmitters to Cospas-Sarsat/Communication satellite(s).

FIG. 2 shows a flow chart illustrating the process of determination of transmission timing per cycle, according to the present invention, step by step. Steps which are configured to achieve the same results by all transmitters are depicted in rectangular frames, while steps which are configured to achieve specific results for specific transmitters are depicted in frames with rounded corners. All steps except one are related to, at least, the preferred embodiment of the present invention. One step, depicted in a dotted line frame, is related to a second embodiment of the present invention.

FIG. 3 illustrates a geographical partitioning of earth surface into eight communication cells, according to the preferred embodiment of the present invention. The figure shows two phases of the globe, the left phase principally depicting the northern hemisphere and the right phase principally depicting the southern hemisphere. The eight cells are similar in area, each in the shape of a spherical triangle. The cells are formed by dividing the earth surface along three great circles: a) longitude 0° (Greenwich, i.e. the prime meridian) and longitude 180° (the International Date Line); b) longitude 90° and longitude 270°; and c) latitude 0° (the equator). The area of four of these cells is colored in gray, while the area of the other four cells is kept in white.

FIG. 4 (4a and 4b) illustrates the footprint of a satellite on earth surface, and is divided to FIG. 4a which shows an isometric view and FIG. 4b which shows a sectional view.

FIG. 4a shows an isometric view of the earth, and a satellite at the zenith of a point on earth surface which is the center of gravity of a spherical triangle cell (colored in gray). The footprint of the satellite covers this entire cell, in addition to parts of neighboring cells.

FIG. 4b shows a sectional view of the earth, and a satellite at a distance of 4 times the earth radius from earth center. The radius of the footprint is an arc of an angle denoted as $\alpha$

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

The invention is directed to a network and method for Time Division Multiple Access (TDMA) communications, comprising a plurality of one-way transmitters sharing a communication channel and at least one matching receiver, and a Global Navigation Satellite System (GNSS) decoder coupled to each of said transmitters, said transmitters configured to define: i) a transmission cycle divided to a set of adjacent time slots; ii) a geographical partition of earth surface to cells; and iii) a sub set of time slots, comprising a plurality of time slots from said set of time slots, allocated to each of said cells; each transmitter configured to transmit during one time slot or less per transmission cycle, wherein said one time slot determined by each transmitter as following: a) determining the start time of transmission cycles and time slots according to at least a timing signal and/or time data acquired from said GNSS decoder; b) determining self location and the corresponding cell according to at least data acquired from said GNSS decoder; c) selecting one time slot from the sub set of time slots allocated to said corresponding cell, in a random or pseudo-random way.

A system according to a preferred embodiment of the present invention is illustrated in FIG. 1, showing an overview of TDMA transmitters in a satellite based network. The figure depicts three TDMA transmitters, each coupled to a GNSS decoder, tuned to detect signals sent from three GNSS satellites. The TDMA transmitters share a narrowband communication channel (not shown . . . ), and are configured to communicate with one receiver (not shown) onboard a SAR communication satellite.

In the preferred embodiment, said GNSS is the US Global Positioning System (GPS). In a second embodiment, said GNSS is the European Galileo system, which at the beginning of 2008 is partially deployed and not yet fully operative. As a person skilled in the art may appreciate, any GNSS decoder (i.e. GNSS receiver) that provides accurate timing signals such as 1 Pulse Per Second (PPS), and timing data such as Time of Day (TOD), and positioning data (longitude and latitude and altitude), is basically suitable for the purpose of the current invention.

In this preferred embodiment, said TDMA transmitters are distress radio beacons and said receiver is satellite mounted, part of a satellite system for SAR, such as Cospas-Sarsat. Principally, this preferred embodiment may be based on the Cospas-Sarsat satellite segment, as well as the GPS. Further, the GNSS decoder according to this embodiment is an off the shelf GPS receiver, while the TDMA transmitters may be based on Cospas-Sarsat compatible beacons, just that the beacon transmission timing is customized according to the present invention. Typically, this customization can be implemented in software, enabling using current beacons' hardware. Cospas-Sarsat radio beacons and GPS receivers are items mostly available on the market, by a considerable number of manufacturers, and very well documented (specific products as well as systems—Cospas-Sarsat and GPS), in a way that a person skilled in the art can utilize in the scope of the present invention.

Further considering the preferred embodiment, these beacons are set to a common 3 KHz width UHF channel, such as 406.022 MHz. In the field, these beacons are normally inactive, by nature, and activated either manually or automatically (e.g. switch is closed when device is turned upside down, floating on water), in a distress/emergency situation. When active, each beacon is configured to periodically transmit a data packet of 190 bits containing its unique ID, location coordinates (longitude, latitude and altitude) as provided by the coupled GPS receiver, and some additional synchronization and status bits. The data is transmitted at 400 bits per second, thus each transmission takes 190/400=475 milliseconds. Such structures of data packets are well practiced in the art.

It is to be noted that the standard Cospas-Sarsat "long message" (including GNSS positioning data) is 520 milliseconds long, containing 144 bits of message plus some system overhead bits, at 400 bits per second. For the simplicity of the present description, the preferred embodiment considers a slightly shorter message, 475 milliseconds long.

Upon activation, the beacons are configured to transmit distress messages (data packets) in a cyclic way, each cycle having a mean time of 50 seconds. FIG. 2 depicts a flow chart illustrating the transmission timing determination process, step by step, which is to be considered by every transmitter, every transmission cycle, according to the preferred embodiment. Typically, this process is administered by software that runs in the transmitter's Central Processing Unit (CPU).

Considering FIG. 2, the first three steps are configured to be set in advance, and be implemented uniformly by all transmitters (beacons), according to the preferred embodiment.

According to the $1^{st}$ step, the transmission cycle is set to 50 seconds and divided into a basic set of 100 adjacent time slots. Hence, the length of each time slots is set to 500 milliseconds, which is in the range between: transmission time of the shortest data packet (475 milliseconds), and the sum of: a) transmission time of the longest data packet (475 milliseconds); plus b) the maximum difference in propagation time of any two TDMA transmissions detectable by one receiver in the network. Since the maximal difference in range from any two TDMA transmitters on earth to a satellite mounted receiver is about 6,400 Kms (earth radius), then the equivalent time difference is about 22 milliseconds.

According to the $3^{rd}$ step, the basic set of 100 time slots per cycle is further divided into two sub sets of time slots; each sub set contains 50 time slots, associated with a geographically defined cluster of cells, in a way known to all the beacons. According to a non limiting example, the first sub set is comprised of all 50 odd time slots ($1^{st}$, $3^{rd}$, ..., $99^{th}$), and the second sub set is comprised of all 50 even time slots ($2^{nd}$, $4^{th}$, ..., $100^{th}$). This geographical partitioning to cells, indicated also in the $2^{nd}$ step in FIG. 2, will be further elaborated following in this section.

Still referring to FIG. 2, subsequent steps are configured to be implemented during operation, considering data acquired in real time by each transmitter, from the coupled GNSS (GPS) decoder.

According to the $4^{th}$ step, each transmitter is configured to determine, in real time, the start time of this transmission cycle and the start time of the time slots in said cycle, based on timing signals and data acquired from the coupled GNSS decoder. As a person skilled in the art may appreciate, a Phased Locked Loop (PLL) method/circuitry may be used by each transmitter to generate various timing signals synchronized with the accurate signals arriving from the coupled GPS receiver.

According to the $5^{th}$ step depicted in FIG. 2, each beacon is configured to monitor its position in real time, by means of its coupled GPS receiver, and accordingly determine which of the two sub sets of time slots is allocated for its transmissions. This selected sub set of time slots will then become the updated set of time slots from which each transmitter may further select a specific time slot, and at this point it covers only half of the original transmission cycle.

According to the $6^{th}$ step depicted in FIG. 2, each beacon is configured to select a specific time slot from the previously selected sub set of time slots, for potential use in this cycle, in a random/pseudo-random way. As already indicated, other methods could be applied at this point, such as an algorithm based on the transmitter's unique ID, which could be efficient in several cases. Yet, the preferred embodiment considers a case in which the number of transmitters is much larger than the number of time slots per cycle, and though the number of active transmitters could be typically less than the number of time slots per cycle, said transmitters are unable to coordinate the allocation of time slots among themselves, since cannot communicate with each other. Thus, at this point, the preferred embodiment applies a pseudo-random selection of a specific time slot, which avoids two nearby beacons from selecting a same transmission slot, cycle after cycle, and constantly collide with each other. Methods for generating random numbers are well practiced in the art, as the skilled person may appreciate. Obviously, a random/pseudo-random selection of time slots cannot totally avoid transmission collisions, yet the entire method is expected to improve the collision rate probability, compared to the present art.

At this point of the transmission timing determination process, each active transmitter has selected one specific time slot in a specific transmission cycle, and this time slot will be utilized for transmission unless denied according to further criteria. If denied, this specific transmitter will not transmit during this specific cycle.

Still referring to FIG. 2, subsequent steps (7-9) consider two cases where transmission is denied during a transmission cycle.

According to the $7^{th}$ step depicted in FIG. 2, a transmission is denied in a specific cycle, if the position of this transmitter did not substantially vary recently. Since the main information that a beacon sends, according to the preferred embodiment, is its self position, then if its position hardly changes, redundant transmissions could be avoided, saving power and increasing other beacons' chances to be detected. So preferably, a transmission is configured to be denied for one cycle if the last transmitted position did not change more than 100 meters.

According to the $8^{th}$ step depicted in FIG. 2, a transmission is denied in a specific cycle if the previous transmission was acknowledged, according to a second embodiment of the present invention. This second embodiment is related to a combined GNSS and SAR Communicating constellation of satellites, which enables a distress beacon to be acknowledged via a coupled GNSS receiver. One particular system planed to offer this combined service is Galileo, basically a GNSS, yet its satellites are designed to additionally carry receivers compatible with Cospas-Sarsat SAR beacons. These receivers are planned to be configured to detect transmissions of Cospas-Sarsat beacons, and (in addition to routing these messages to ground stations for SAR purposes) acknowledge such a transmission, through the navigation signals transmitted from same Galileo satellites. This way, a Galileo receiver would be able to detect the acknowledgement and communicate it to a coupled transmitter. The second embodiment of the present invention considers such a case, where a beacons' transmission is acknowledged, and this acknowledgement is routed to said beacon by said coupled GNSS (Galileo) receiver. Then, at said transmitter, in this second embodiment, a current cycle transmission is configured to be denied if the previous cycle transmission was acknowledged.

Still considering the geographical partitioning to cells, associated with time slot sub sets, following the discussion related to the $2^{nd}$ step of FIG. 2. According to the preferred embodiment, the surface of the globe is divided into two clusters of cells, each cluster comprised of four equal in area cells, each cell in the shape of a spherical equilateral triangle. FIG. 3 illustrates the geographical partitioning of earth surface into eight communication cells, according to the preferred embodiment. The cells are formed dividing the earth surface by 2 meridians (longitude 0°/180° and longitude 90°/270°) and by the equator (latitude 0°). As shown in FIG. 3, four of the cells are colored in gray, forming one cluster, and the other four cells, in white, form the other cluster. This way, cells clustered together have no common side (edge), just common corners.

It is interesting to note that this partitioning of a sphere surface to eight triangles obeys Leonhard Euler's Law associated with the number of faces (F), corners (C) and edges (E) in simple shapes, according to the formula $F+C-E=2$. In this preferable partitioning, $F=8$, $C=6$ and $E=12$.

As a skilled person may observe, all cells are based on the equator and cornered at the poles, with equal sides of 90° arcs, i.e. a quarter of earth circumference. As already indicated, all triangular cells in a cluster have no common side, just common corners. Hence, a substantial geographical separation is achieved among cells in a cluster, and consequently a substantial communication isolation, i.e. a considerable chance that simultaneous transmissions from different cells in a cluster (sharing the same sub set of time slots) will be detected by different satellites, as long as the satellite coverage is good enough. For the purpose of the present invention, a good coverage means, at least, a total and continuous coverage of earth surface by communication satellites, with substantially small footprints. This matter will be elaborated later.

The geographical separation achieved by the preferable partitioning, as indicated above, can be further observed related to the following geometric analysis. As a skilled person may appreciate, if beacons are uniformly distributed in a triangular cell, then the average location of these beacons would be at the center of gravity of the triangle. In geometry, the center of gravity of a triangle, also known as its centroid or barycenter, is the point of intersection of the three triangle medians. The centroid cuts every median in the ratio 2:1, i.e. the distance between a vertex (corner) and the centroid is twice as large as the distance between the centroid and the midpoint of the opposite side. Furthermore, in an equilateral triangle, medians are also altitudes and angle bisectors. So, referring back to FIG. 3, the two gray cells on the northern hemisphere, which are in the same cluster, have a center of gravity on latitude 30°N, and longitude 45°E/135°W (on the same great circle) respectively. Then, the angular distance between the corresponding centers of gravity of these two cells (angle between lines connecting earth center with the two centers of gravity, respectively), measured along longitude 45°E/135°W, is 120°, which is equivalent to 7200 nautical miles. Clearly, for symmetrical reasons, 120° is also the angular distance between (the center of gravity of) any two cells in a cluster, according to this geographical partition. Such a cellular partitioning can be quite efficient considering a satellite constellation as Cospas-Sarsat, particularly LEO satellites augmented by about 50 MEO GPS+Galileo satellites, which may normally introduce more than 10 satellites in Line of Sight (LOS) with any point on earth. Furthermore, as a skilled person could already observe, the cells that are closer to each other in terms of angular distance, i.e. those sharing a common side, are 60° distant from each other, however belong to different clusters and accordingly do not share the same time slots. This way, cells which are in a same cluster and share the same time slots are geographically isolated from each other by the other cluster of cells, which is allocated with a different sub set of time slots.

It is interesting to analyze the contribution of each of the steps indicated in FIG. 2 for reducing the transmission collision rate and increasing the channel capacity.

As already indicated, applying a basic set of time slots, as basically indicated by step 1, can double the channel throughput, as slotted Aloha upgraded Aloha.

The contribution of steps 2-5 depends on several factors, mainly: the specific geographical cellular partitioning and association of time slots with cells, the geographical distribution of transmitters and the spatial deployment of receivers. For the purpose of this analysis, transmitters are assumed to be uniformly distributed on earth surface, and earth surface is geographically partitioned to eight triangular cells, every four cells forming a cluster, associated with a sub set of time slots, according to the preferred embodiment and as illustrated in FIG. 3.

Following this geographical partitioning, the collision rate probability (CRP) for any two transmitters on earth surface, may be considered according to the following possible cases: a) transmitters are in same cluster and same cell; b) transmitters are in same cluster but not same cell; c) transmitters are in different clusters, in cells that share a common side; d) transmitters are in different clusters, in cells that share no common side. Accordingly, CRP will be denoted CRPa, CRPb, CRPc and CRPd.

Also, the probability for case a, i.e. the probability of two transmitters to be placed in same cluster and same cell, assuming a uniform geographical distribution of transmitters, will be denoted as GPa, and correspondingly GPb, GPc and GPd. Then, the total combined CRP for any two independent transmitters on the globe, denoted as CRPt, is (formula 1):

$$CRPt = CRPa \times GPa + CRPb \times GPb + CRPc \times GPc + CRPd \times GPd \tag{F1}$$

As can be observed from FIG. 3, $GPa=\frac{1}{8}$; $GPb=\frac{3}{8}$; $GPc=\frac{3}{8}$; and $GPd=\frac{1}{8}$, so combined with formula 1:

$$CRPt = \frac{1}{8} \times (CRPa + CRPd) + \frac{3}{8} \times (CRPb + CRPc) \tag{F2}$$

Further complicating the annotation, CRP could be distinguished between CRP post step 1, denoted as CRP1, and CRP post step 5, denoted as CRP5, and accordingly CRP1t, CRP5t, etc. Obviously, the ratio between CRP1t and CRP5t reflects the contribution or processing gain of steps 2-5, for improving the collision rate probability and consequently the channel capacity.

Considering that after step 5, only half of the time slots are available for transmission for any transmitter, compared to the basic set of time slots available for any transmitter post step 1, and considering the spatial satellite deployment to be the same post step 1 and post step 5, so, for two transmitters sharing the same set of time slots, as in case a and case b, then:

$$CRP5a = 2 \times CRP1a; \text{ and } CRP5b = 2 \times CRP1b \tag{F3}$$

However, when two transmitters do not share the same set of time slots, as in cases 5c and 5d, there are no transmission collisions so:

$$CRP5c = CRP5d = 0 \tag{F4}$$

As a skilled person could already observe, any two cells related to CRPd, i.e. in different clusters and not sharing any common side, are antipodean, i.e. with an average angular separation of 180°. Thus, it could be assumed that these cells face different satellites, so:

$$CRP1d = CRP5d = 0. \tag{F5}$$

Updating F2 according to F3-F5, for post step 1 and post step 5 respectively, results in:

$$CRP1t = \frac{1}{8} \times CRP1a + \frac{3}{8} \times (CRP1b + CRP1c) \tag{F6}$$

$$CRP5t = \frac{1}{4} \times CRP1a + \frac{3}{4} \times CRP1b \tag{F7}$$

At this point, it is interesting to study the correlation between CRP1b and CRP1c and the preferable geographic partitioning. As CRPb is related to transmitters placed in a same cluster but different cells, such transmitters would obtain an average angular separation of 120°, as the angular distant between the center of gravity of the respective cells; CRPc is related to transmitters placed in different clusters, in cells that share a common side, so respective transmitters would obtain an average angular separation of 60° only.

Assuming for example, that at a certain moment, there is a satellite above each such cell (which is an equilateral spherical triangle), right over its center of gravity (which is the point of intersection of the triangle medians), with a footprint radius equals to this triangle's median. Such an example is illustrated in FIG. 4a. As a median is also an altitude in an equilateral triangle, it is easy to see that this footprint radius is a 90° arc. Clearly, this footprint covers, in addition to said cell (colored in gray, in FIG. 4a), an area A on neighboring cells that share a side with said cell (cells colored in white), and an area B on neighboring cells that share only a corner with said cell (cells colored in gray). Then, as a skilled person may observe, A is approximately the base-near ⅔ part of a white neighboring cell, and B is approximately the vertex-near ⅓ part of a gray neighboring cell; thus, according to Thales theorem, B=⅑×cell area; and A=⅝×cell area. So roughly, according to this example, and neglecting other factors such as antenna orientation and radiation patterns, this satellite will serve all transmitters placed in the center cell, ⅝ of the transmitters placed in each of the (white) neighboring cells that share a side with said central cell, and ⅑ of the transmitters placed in each of the (gray) neighboring cells that share just a corner with said center cell, in average. Hence, CRP1c=⅝× CRP1a; and CRP1b=⅑×CRP1a. According to this example, F6 and F7 would be:

$$\text{example}(CRP1t) = \tfrac{1}{8} \times CRP1a + \tfrac{3}{8} \times CRP1a = \tfrac{1}{2} \times CRP1a \quad (F8)$$

$$\text{example}(CRP5t) = \tfrac{1}{4} \times CRP1a + \tfrac{3}{4} \times \tfrac{1}{9} \times CRP1a = \tfrac{1}{3} \times CRP1a \quad (F9)$$

So, according to this example, steps 2-5 improved the collision rate probability by ⅔, i.e. reduced the collision rate by 33%.

The above example assumes a satellite footprint of a 90° arc radius, i.e. 5400 nautical miles. For reference, it is interesting to inspect the footprint of a GPS satellite on earth surface, as GPS satellites are about to augment the Cospas-Sarsat SAR system, which is related to the present invention. As well known in the art, GPS satellites orbit at about 20K Kms above the globe, i.e. about 4 times the earth radius measured from earth center. FIG. 4b is an illustration of a GPS satellite orbiting above earth surface. As can be seen in FIG. 4b, such an orbital altitude corresponds to a footprint radius of a spherical arc denoted as α, where cos (α)=¼. Hence, α is approximately 75°. So, the footprint of GPS satellites is smaller than the above example, providing a better cellular resolution for the purpose of the present invention.

Steps 7 and 8 indicated in FIG. 2 may provide additional contribution to reduce transmission collisions, by avoiding transmission of redundant data. The specific contribution of step 7 depends on the speed of the transmitter. According to the preferred embodiment, a transmission is denied if the beacon did not move more than 100 meters during the last 50 seconds, in average. This is equivalent to a speed of 7.2 Km/hour or about 4 knots. Usually, walking people and drifting/swimming people move slower, so this step can provide a considerable contribution, specifically related to SAR. Step 8 may provide a significant contribution as well if transmissions be acknowledged. This method is specifically efficient since it does not require providing a dedicated communications receiver by the transmitter, to detect the acknowledgement, since the coupled GNSS receiver is utilized for that purpose. Saving an extra receiver means saving of costs, power consumption, size and weight.

As a person skilled in the art may appreciate, there are further ways to refine the geographical partitioning of earth surface, related to the present invention, in order to increase the channel capacity. Two such methods are following discussed: a) consider the statistics of geographical distribution of transmitters; b) consider the spatial deployment of satellite mounted receivers.

Considering the statistics of geographical distribution of transmitters, may further decrease the collision rate by avoiding transmission bottlenecks in the network. Adjusting cell areas according to distribution/population of transmitters, based on statistical data acquired in advance, can enable defining cells that contain similar number of transmitters, or preferably a similar number of active transmitters, and avoid too congested cells.

According to one aspect of the current invention, TDMA transmitters which are distress radio beacons are deployed with a compatible satellite system for SAR. While defining the boundaries of the geographical cells according to the present invention, the Bermuda triangle, notorious for ship and aircraft accidents, also one of the most heavily shipping areas in the world, will be preferably divided into relatively small cells, to ensure sufficient quality of service, i.e. a satisfactory probability of a distress message to be detected.

Considering the spatial deployment of satellite mounted receivers, may further decrease the collision rate by avoiding a high level of correlation between one receiver and too many transmitters. Adjusting cell boundaries according to the satellites deployment, even in real time as LEO and MEO satellites dynamically move relatively to earth surface, may achieve better communication isolation among cells, i.e. a better chance for different transmitters to be served by different satellite mounted receivers, and consequently a lower rate of transmission collisions.

According to another aspect of the invention, TDMA transmitters which are distress radio beacons are deployed in an area that suffers from a nature catastrophe or man made violent conflict. The compatible constellation of SAR satellites is comprised of several types of satellites, including LEO satellites that carry remote sensing payloads, in addition to the SAR payload, with a relatively small footprint on earth surface. One of these LEO satellites could then be temporarily positioned above such an area of interest, for remote sensing purposes. Then, a cell or several cells in the area of the footprint of this satellite could be defined according to the present invention, in a way that distress radio beacons in this area will most probably be served by this satellite, and beacons placed there will benefit from a relatively low chance to collide with each other.

According to an additional aspect of the invention, TDMA transmitters are installed in vehicles, belonging to a fleet of vehicles, including cars, tracks, ships and airplanes. Each transmitter is configured to periodically report the position of its attached vehicle, to a constellation of satellites, which retransmit the reports to the terrestrial headquarters. The main goal of this network is to track the vehicles in order to better control the operation of the fleet, and efficiently deal with operational and emergency situations. Transmitters are configured to transmit, according to the present method, only when their position is changed in more than 1 kilometer.

The invention is further directed to a transmitter in a network for Time Division Multiple Access (TDMA) communications, comprising a plurality of such one-way transmitters sharing a communication channel and at least one matching receiver, and a Global Navigation Satellite System (GNSS) decoder coupled to each of said transmitters, said transmitters configured to define: i) a transmission cycle divided to a set of adjacent time slots; ii) a geographical partition of earth surface to cells; and iii) a sub set of time slots, comprising a plurality of time slots from said set of time slots, allocated to each of said cells; each transmitter configured to transmit during one time slot or less per transmission cycle, wherein said one time slot determined by each transmitter as following: a) determining the start time of transmission cycles and time slots according to at least a timing signal and/or time data acquired from said GNSS decoder; b) determining self location and the corresponding cell according to at least data acquired from said GNSS decoder; c) selecting one time slot from the sub set of time slots allocated to said corresponding cell, in a random or pseudo-random way.

The invention is also directed to a computer program product in a computer readable medium for a transmitter in a network for Time Division Multiple Access (TDMA) communications, comprising a plurality of one-way transmitters sharing a communication channel and at least one matching receiver, and a Global Navigation Satellite System (GNSS) decoder coupled to each of said transmitters, said transmitters configured to define: i) a transmission cycle divided to a set of adjacent time slots; ii) a geographical partition of earth surface to cells; and iii) a sub set of time slots, comprising a plurality of time slots from said set of time slots, allocated to each of said cells; each transmitter configured to transmit during one time slot or less per transmission cycle, wherein said one time slot determined by each transmitter as following: a) determining the start time of transmission cycles and time slots according to at least a timing signal and/or time data acquired from said GNSS decoder; b) determining self location and the corresponding cell according to at least data acquired from said GNSS decoder; c) selecting one time slot from the sub set of time slots allocated to said corresponding cell, in a random or pseudo-random way.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. A system for Time Division Multiple Access (TDMA) communications, comprising a plurality of one-way transmitters sharing a communication channel and at least one matching receiver, and a Global Navigation Satellite System (GNSS) decoder coupled to each of said transmitters, said transmitters configured to define: i) a transmission cycle divided to a set of adjacent time slots; ii) a geographical partition of earth surface to cells; and iii) a sub set of time slots, comprising a plurality of time slots from said set of time slots, allocated to each of said cells; each transmitter configured to transmit during one time slot or less per transmission cycle, wherein said one time slot determined by each transmitter as following: a) determining the start time of transmission cycles and time slots according to at least a timing signal and/or time data acquired from said GNSS decoder; b) determining self location and the corresponding cell according to at least data acquired from said GNSS decoder; c) selecting one time slot from the sub set of time slots allocated to said corresponding cell, in a random or pseudo-random way.

2. A system according to claim 1, wherein said GNSS is at least one of the following: US Global Positioning System (GPS); Russian GLONASS (or GLONAS); European Galileo; Chinese COMPASS; Indian IRNSS.

3. A system according to claim 1, wherein said transmitters are configured to transmit data packets, and said time slot period is set to a minimum of the transmission time of the shortest data packet, and to a maximum of the sum of: a) the transmission time of the longest data packet; plus b) the maximum difference in propagation time of any two TDMA transmissions detectable by one receiver in the network.

4. A system according to claim 1, wherein said cell defined at least according to the statistics of the geographical distribution of said transmitters and/or according to the spatial deployment of said receiver(s).

5. A system according to claim 1, wherein the same sub set of time slots is allocated to a cluster of cells, and cells in a cluster are substantially geographically separated from each other.

6. A system according to claim 1, wherein each cell is in the shape of a spherical polygon, defined by the geographical coordinates of its corners, and cells which share more than one point are allocated with different sub sets of time slots.

7. A system according to claim 1, wherein each of said transmitters obtains a unique identification number (ID), and is configured to transmit data indicating this ID.

8. A system according to claim 1, wherein each transmitter is configured to transmit data representing its location/position.

9. A system according to claim 1, wherein said receiver is mounted on a satellite.

10. A system according to claim 1, wherein said transmitter is configured to further control its transmission according to the variation of its position in time.

11. A system according to claim 1, wherein said receiver is coupled with said GNSS, and said GNSS is configured to communicate acknowledgements of transmissions detected by said receiver to said GNSS decoders.

12. A system according to claim 1, wherein said receiver is coupled with said GNSS, said GNSS configured to communicate acknowledgements of transmissions detected by said receiver to said GNSS decoders, and said transmitter is configured to further control its transmission upon receiving said acknowledgements.

13. A system according to claim 1, wherein said transmitters are distress radio beacons.

14. A system according to claim 1, wherein said transmitters and said receiver are part of a satellite system for Search and Rescue (SAR), such as but not limited to COSPAS-SARSAT.

15. A system according to claim 1, wherein each of said transmitters is one of the following types of distress radio beacons: a) Emergency Position Indicating Radio Beacon (EPIRB) for marine use; b) Emergency Locator Transmitter (ELT) for aviation use; c) Personal Locator Beacon (PLB) for terrestrial/personal use.

16. A system according to claim 1, wherein each of said transmitters is attached to an object to be located, from the following non limiting list: person, animal, pet, vehicle, weapon, ammunition, valuable asset.

17. A transmitter in a network for Time Division Multiple Access (TDMA) communications, comprising a plurality of such one-way transmitters sharing a communication channel and at least one matching receiver, and a Global Navigation Satellite System (GNSS) decoder coupled to each of said transmitters, said transmitters configured to define: i) a transmission cycle divided to a set of adjacent time slots; ii) a geographical partition of earth surface to cells; and iii) a sub set of time slots, comprising a plurality of time slots from said set of time slots, allocated to each of said cells; each transmitter configured to transmit during one time slot or less per transmission cycle, wherein said one time slot determined by each transmitter as following: a) determining the start time of transmission cycles and time slots according to at least a timing signal and/or time data acquired from said GNSS decoder; b) determining self location and the corresponding cell according to at least data acquired from said GNSS decoder; c) selecting one time slot from the sub set of time slots allocated to said corresponding cell, in a random or pseudo-random way.

18. A computer program product in a computer readable medium for a transmitter in a network for Time Division Multiple Access (TDMA) communications, comprising a plurality of one-way transmitters sharing a communication channel and at least one matching receiver, and a Global Navigation Satellite System (GNSS) decoder coupled to each of said transmitters, said transmitters configured to define: i) a transmission cycle divided to a set of adjacent time slots; ii) a geographical partition of earth surface to cells; and iii) a sub set of time slots, comprising a plurality of time slots from said set of time slots, allocated to each of said cells; each transmitter configured to transmit during one time slot or less per transmission cycle, wherein said one time slot determined by each transmitter as following: a) determining the start time of transmission cycles and time slots according to at least a timing signal and/or time data acquired from said GNSS decoder; b) determining self location and the corresponding cell according to at least data acquired from said GNSS decoder; c) selecting one time slot from the sub set of time slots allocated to said corresponding cell, in a random or pseudo-random way.

* * * * *